United States Patent
Somers (10) Patent No.: US 12,042,057 B2
(45) Date of Patent: Jul. 23, 2024

(54) SEAT TOPPER DEVICE, SYSTEM, AND METHOD OF USE THEREOF

(71) Applicant: John Victor Somers, San Diego, CA (US)

(72) Inventor: John Victor Somers, San Diego, CA (US)

(73) Assignee: John Victor Somers, San Diego, CA (US)

( * ) Notice: Subject to any disclaimer, the term of this patent is extended or adjusted under 35 U.S.C. 154(b) by 253 days.

(21) Appl. No.: 17/777,105

(22) PCT Filed: Nov. 16, 2020

(86) PCT No.: PCT/US2020/060706
§ 371 (c)(1),
(2) Date: May 16, 2022

(87) PCT Pub. No.: WO2021/097415
PCT Pub. Date: May 20, 2021

(65) Prior Publication Data
US 2022/0395099 A1    Dec. 15, 2022

Related U.S. Application Data

(60) Provisional application No. 62/936,286, filed on Nov. 15, 2019.

(51) Int. Cl.
*B60N 2/60* (2006.01)
*A47C 7/02* (2006.01)
(Continued)

(52) U.S. Cl.
CPC .............. *A47C 7/021* (2013.01); *A47C 7/425* (2013.01); *A47C 7/62* (2013.01); *A47C 31/11* (2013.01);
(Continued)

(58) Field of Classification Search
CPC ........... A47C 7/021; A47C 7/425; A47C 7/62; A47C 31/11; B60N 2/60; B60N 2/6018; B60N 2/6009
See application file for complete search history.

(56) References Cited

U.S. PATENT DOCUMENTS

| | | | |
|---|---|---|---|
| 2,254,466 A * | 9/1941 | Albert | A47D 1/0085 297/228 |
| 5,338,092 A | 8/1994 | Wiltsey et al. | |

(Continued)

FOREIGN PATENT DOCUMENTS

GB    2472867 A    2/2011

*Primary Examiner* — Syed A Islam
(74) *Attorney, Agent, or Firm* — Troutman Pepper Hamilton Sanders LLP; James E. Schutz; Korbin Blunck (57) ABSTRACT

Devices, systems, and methods for use of a stowable seat topper are described. The stowable seat topper can include a seat portion, a back portion attached to the seat portion, arm portions attached to the back portion, and cushion portions attached to the back portion. The seat topper can include fasteners configured to secure the seat topper when in a stowed state. The seat portion, back portion, and arm portions can comprise molded foam and provide ergonomic support to a user. Furthermore, the seat topper can be configured to transition between a stowed state and a deployed state. In the stowed state, the seat portion, back portion, and arm portions can be rolled together and securing in placed by fasteners. In the deployed state, the seat portion, the back portion, the arm portions, and the cushion portions can be unrolled, aligned with a seat, and secured to the seat.

20 Claims, 10 Drawing Sheets

(51) Int. Cl.
*A47C 7/42* (2006.01)
*A47C 7/62* (2006.01)
*A47C 31/11* (2006.01)

(52) U.S. Cl.
CPC ............. *B60N 2/60* (2013.01); *B60N 2/6009* (2013.01); *B60N 2/6018* (2013.01)

(56) References Cited

U.S. PATENT DOCUMENTS

| | | | |
|---|---|---|---|
| 7,172,246 B1 | 2/2007 | Itakura | |
| 7,374,240 B2* | 5/2008 | Gold | B60N 2/6018 |
| | | | 297/229 |
| 7,461,894 B2* | 12/2008 | Leeds | B60N 2/7005 |
| | | | 297/229 |
| 7,614,691 B1* | 11/2009 | Schmitz | A47C 7/021 |
| | | | 297/229 |
| 7,878,588 B2* | 2/2011 | Snedeker | B60N 2/60 |
| | | | 297/229 |
| 7,917,403 B2* | 3/2011 | Leeds | A47C 7/425 |
| | | | 705/26.1 |
| 8,732,877 B2 | 5/2014 | Ramp | |
| 8,757,723 B1* | 6/2014 | Faust | B60N 2/995 |
| | | | 297/423.39 |
| 8,864,221 B1* | 10/2014 | Delvilla | A47C 7/5066 |
| | | | 297/180.12 |
| 8,870,283 B2* | 10/2014 | Daley | B60N 2/28 |
| | | | 297/229 |
| 2002/0096919 A1* | 7/2002 | Sparks | B60N 2/6036 |
| | | | 297/228.12 |
| 2010/0139001 A1 | 6/2010 | Mangano | |
| 2016/0229126 A1* | 8/2016 | Every | A47C 7/029 |
| 2017/0224118 A1* | 8/2017 | Fernandez | A47C 7/425 |

\* cited by examiner

SEAT TOPPER DEVICE, SYSTEM, AND METHOD OF USE THEREOF

CROSS REFERENCE TO RELATED APPLICATIONS

This application is filed under 35 U.S.C. Section 371 based on PCT/US20/60706, filed 16 Nov. 2020, which claims priority to U.S. Provisional Patent Application No. 62/936,286 filed 15 Nov. 2019, the contents of which are incorporated herein by reference in their entirety as if set forth verbatim.

FIELD

Examples of the present disclosure relate to seat toppers that can be used for providing a comfortable seat for a user and stowed for transporting or storing the seat topper between uses.

BACKGROUND

Seating options at events or during travel are unfortunately quite limiting for the cost-conscious consumer. Many seating options at events are hard and uncomfortable and are often made of wood, metal, or even concrete. Similarly, many seats available on airplanes, buses, trains, boats, or other public transportation vehicles are hard and uncomfortable. After sitting on such uncomfortable surfaces for even a short amount of time, the buttocks and lower back may become sore and agitated. Such discomfort can limit the attendee's or passenger's ability to enjoy the event or travel and can limit the length of time the attendee or passenger can be at the event or in the vehicle. Furthermore, such uncomfortable seating can lead to more severe health concerns such as chronic back, hip, and neck problems.

Existing solutions to this problem include foldable seats or simple pads or cushions that can be placed over a bench, chair, or other hard seating option. These solutions, however, are either cumbersome to transport or do not provide adequate ergonomic support for a user to create a comfortable and healthy alternative to the traditional seating option. What is needed, therefore, is a seat topper that can provide ergonomic and comfortable support for a user while still being easily stowed and transported.

These and other problems are addressed by the technology disclosed herein.

SUMMARY

Accordingly, the inventors of this disclosure have recognized that there is a need for the following solution.

In some examples the disclosed technology can include a stowable molded foam seat topper having a seat portion, a back portion attached to the seat portion, one or more arm portions attached to the back portion, one or more cushion portions attached to the back portion, and one or more fasteners configured to secure the stowable molded foam seat topper in a stowed state when fastened. The seat portion, the back portion, and the one or more arm portions can each comprise a molded foam material and can be configured to impart ergonomic support to a user when in a deployed state. The stowable molded foam seat topper can be configured to be transitioned between the stowed state and the deployed state. For example, the stowed state can include the seat portion, the back portion, the one or more arm portions, and the one or more cushion portions being rolled together and secured in place by the one or more fasteners. Furthermore, the deployed state can be the seat portion, the back portion, the one or more arm portions, and the one or more cushion portions being unrolled, aligned with a seat, and secured to the seat.

The one or more fasteners can be straps configured to secure the stowable molded foam seat topper in the stowed state. The fasteners can include a hook and loop fastener, a snap button, a magnet, an elastic band, a drawstring, or any other suitable fastener that can secure the stowable molded foam seat topper in the stowed state. The straps can also secure the stowable molded foam seat topper to the seat when in the deployed state.

In some examples, the stowable molded foam seat topper can include one or more handles that can be gripped by a user to transport the stowable molded foam seat topper when in the stowed state. The stowable molded foam seat topper can be configured to be portable when in the stowed state. The stowable molded foam seat topper can include one or more securing fasteners configured to secure the stowable molded foam seat topper to the seat when in the deployed state. The one or more securing fasteners can be the same as, or be different from, the one or more fasteners. The one or more securing fasteners further can include a hook and loop fastener, a snap button, a magnet, an elastic band, a drawstring, or any other suitable type fastener that can secure the stowable molded foam seat topper to the seat when in the deployed state.

The seat portion, back portion, one or more arm portions, and cushion portions can be or include gel memory foam. At least one of the one or more cushion portions can provide ergonomic support to a user's neck and shoulders when the user is seated upon the stowable molded foam seat topper. For example, the one or more cushion portions can be a wrap neck pillow. Furthermore, at least one of the one or more cushion portions can be configured to provide ergonomic support to a user's hips and sides when a user is seated upon the stowable molded foam seat topper. Additionally, one of the one or more cushion portions can be configured to provide ergonomic support to a user's lower back when a user is seated upon the stowable molded foam seat topper. The stowable molded foam seat topper can include one or more arm cushion portions attached to the one or more arm portions. In some examples, the one or more cushion portions can be hypoallergenic viscoelastic foam and/or cooling gel beads.

The stowable molded foam seat topper can include a storage pocket attached to the seat portion that can store one or more objects. In some examples, the storage pocket can be configured to secure the stowable molded foam seat topper in the stowed state. The stowable molded foam seat topper can include a battery and one or more charging ports. The battery and one or more charging ports can be configured to provide a charge to a connected electronic device.

In some examples, the stowable molded foam seat topper can include a removeable nonslip cover configured to cover the stowable molded foam seat topper. The removeable nonslip cover can be or include a stretch-to-fit skirt configured to secure the removeable nonslip cover to the stowable molded foam seat topper. The removeable nonslip cover can include a water-resistant material. The removeable nonslip cover can include a textured backing configured to prevent sliding of the removeable nonslip cover on the stowable molded foam seat topper. The removeable nonslip cover can be machine washable.

In some examples, when the stowable molded foam seat topper is in the deployed state, the seat portion and the back portion can be generally orthogonal to each other. Furthermore, when the stowable molded foam seat topper is in the stowed state, the seat portion, the back portion, the one or more arm portions, and the one or more cushion portions can be tightly rolled together like a sleeping bag and secured in place by the one or more fasteners.

The disclosed technology can also include a method of deploying a stowable seat topper on a seat. The method can include detaching one or more fasteners from the stowable seat topper in a stowed state. The stowable seat topper can include a seat portion, a back portion attached to the seat portion, one or more arm portions attached to the back portion, and one or more cushion portions attached to the back portion. The seat portion, the back portion, and the one or more arm portions can each be or include a molded foam material and be configured to provide ergonomic support to a user when in a deployed state. The one or more fasteners can be configured to secure the stowable seat topper in a stowed state when fastened. The stowed state can be defined by the stowable seat topper being rolled and secured in place by the one or more fasteners to be portable between one or more locations. The method can include unrolling the stowable seat topper from the stowed state to an unrolled state, aligning the stowable seat topper in the unrolled state with the seat, and securing the stowable seat topper to the seat with the one or more fasteners. The method can include placing the stowable seat topper on the seat. The stowable seat topper can be formed of integrally molded pliable memory foam.

Detaching one or more fasteners can include loosening one or more straps, detaching a hook and look fastener, detaching a magnetic fastener, detaching a snap button, or detaching any suitable fastener for the application. Aligning the stowable seat topper in the unrolled state with a seat can include aligning a head rest portion of the stowable seat topper with a head rest of the seat, aligning a seat portion of the stowable seat topper with a seat portion of the seat, and/or aligning an arm portion of the stowable seat topper with an arm rest of the seat.

In some examples, securing the stowable seat topper to the seat with the one or more fasteners can include securing the back portion of the stowable seat topper to a back rest of the seat and securing the one or more arm portions to one or more arm rests of the seat. Securing the stowable seat topper to the seat with the one or more fasteners can include securing the back portion of the stowable seat topper to the seat. Securing the back portion of the stowable seat topper to the seat can include attaching a strap around a back portion of the seat with a hook-and-loop fastener, a magnetic fastener, a snap button, a button, or any other suitable type of fastener. Furthermore, securing the back portion of the stowable seat topper to the seat can include placing one or more straps around a head rest of the seat and securing the one or more straps around the head rest with a magnetic fastener. Securing the stowable seat topper to the seat with the one or more fasteners can be or include securing the one or more arm portions of the stowable seat topper to the seat. In some examples, securing the one or more arm portions of the stowable seat topper to the seat can include attaching a strap around an arm rest of the seat with a hook-and-loop fastener, a magnetic fastener, a snap button, a button, or any other suitable type fastener for the application.

The disclosed technology can also include a method of stowing a stowable seat topper. The method can include detaching the stowable seat topper from a seat. The stowable seat topper can include a seat portion, a back portion attached to the seat portions, one or more arm portions attached to the back portion, one or more cushion portions attached to the back portion, and one or more fasteners. The seat portion, the back portion, and the one or more arm portions can each be or include a molded foam material and can be configured to provide ergonomic support to a user when in a deployed state. The one or more fasteners can be configured to secure the stowable seat topper in a stowed state when fastened. In some examples, the stowed state can be defined by the stowable seat topper being rolled and secured in place by the one or more fasteners to be portable between one or more locations.

The method can also include removing the stowable seat topper from the seat, gripping an end of the stowable seat topper and rolling the stowable seat topper to a rolled state, and securing the stowable seat topper in the rolled state with the one or more fasteners to secure the stowable seat topper in the stowed state.

Detaching the stowable seat topper from the seat can include detaching one or more straps from around the seat, the one or more straps including a hook-and-loop fastener. Detaching the stowable seat topper from the seat can include detaching one or more hook-and-loop fasteners of the stowable seat topper from corresponding hook-and-loop fasteners of the seat. Detaching the stowable seat topper from the seat can include detaching one or more straps of the stowable seat topper, the one or more straps can be or include one or more magnetic fasteners. Detaching the stowable seat topper from the seat can include detaching a magnetic fastener of the stowable seat topper from a corresponding magnetic fastener of the seat. The corresponding magnetic fastener can be a magnetic component of the seat.

In some examples, the one or more fasteners can be one or more straps having a hook-and-loop fastener, a magnetic fastener, a button, a snap button, or any other suitable fastener for the application. The one or more fasteners can also be or include a pocket of the stowable seat topper and the stowable seat topper can be configured to be stored inside of the pocket of the stowable seat topper. The pocket can be attached to the seat portion of the stowable seat topper.

The present disclosure will be more fully understood from the following detailed description of embodiments thereof, taken together with the drawings.

BRIEF DESCRIPTION OF THE DRAWINGS

While the specification concludes with claims, which particularly point out and distinctly claim the subject matter described herein, it is believed the subject matter will be better understood from the following description in conjunction with the accompanying drawings, in which like numerals indicate like structural elements and features in various figures. The drawings are not necessarily to scale, emphasis instead being placed upon illustrating principles of the disclosure. The figures depict one or more implementations of the inventive devices, by way of example only, not by way of limitation.

DETAILED DESCRIPTION

Although examples of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. By "comprising" or "containing" or "including" it is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

The features of the presently disclosed solution may be economically manufactured or assembled by using one or more distinct parts and associated components which, may be assembled together for removable or integral application. Unless defined otherwise, all terms of art, notations and other scientific terms or terminology used herein have the same meaning as is commonly understood by one of ordinary skill in the art to which this disclosure belongs.

In some cases, terms with commonly understood meanings are defined herein for clarity and/or for ready reference, and the inclusion of such definitions herein should not necessarily be construed to represent a substantial difference over what is generally understood in the art.

As used herein, the term "user", "subject", "end-user" or the like is not limited to a specific entity or person. The term "deployed state," as used herein, generally refers to a state of the seat topper wherein the seat topper is placed on a seat such that a user may be seated upon the seat topper, irrespective of whether the seat topper is secured to the seat or is not secured to the seat. The term "stowed state," as used herein, generally refers to a state of the seat topper wherein the seat topper is removed from the seat and is in a compact or otherwise stowable configuration (e.g., placed in a configuration where the seat topper can be easily stored for later use) such that the seat topper can be easily stowed and/or transported, irrespective of whether the seat topper is secured in the stowed state by straps, fasteners, a bag, or otherwise. The term "unrolled state," as used herein, generally refers to a state of the seat topper where the seat topper has been unrolled from a stowed or rolled state and may be generally flat or in a deployed state. The term "rolled state," as used herein, generally refers to a state of the seat topper wherein the seat topper is rolled up or stowed in a compact manner (e.g., tightly rolled up like a sleeping bag or blanket) but may or may not be secured to remain in the rolled state.

Figure 1:
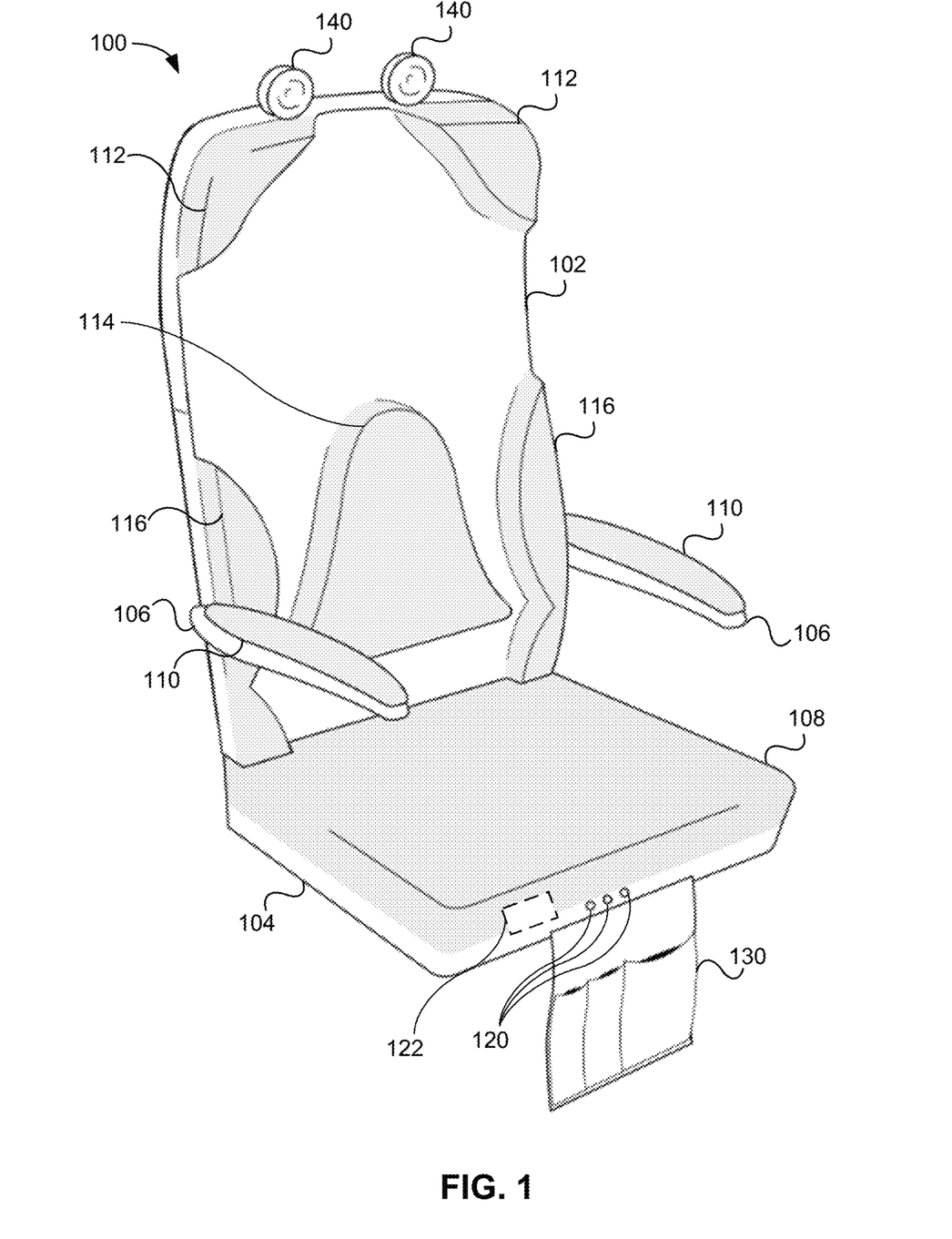
FIG. 1 is a top perspective view of an exemplary seat topper in a deployed state, according to an example of the present disclosure.
Figure 2:
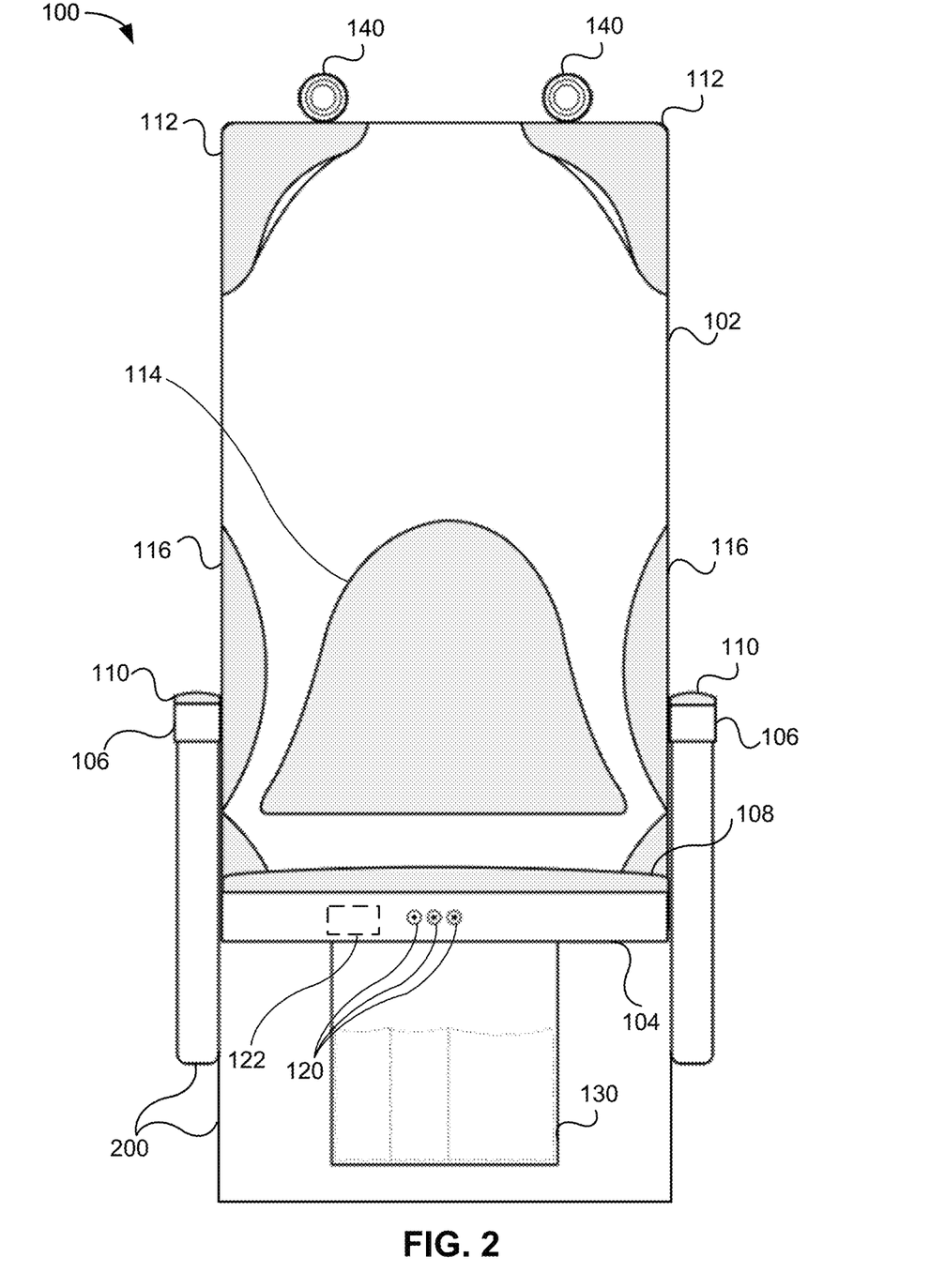
FIG. 2 is a front view of an exemplary seat topper in a deployed state, according to an example of the present disclosure.

The solution of this disclosure resolves the problems in the art by providing a seat topper that can provide an ergonomic and comfortable support to a user when placed over a seat and the user is seated thereon. Turning to the drawings, in which like numerals represent like elements, FIG. 1 is a top perspective view of an exemplary seat topper 100 in a deployed state, according to an example of the present disclosure. Although the seat topper 100 depicted in FIG. 1 illustrates an exemplary seat topper configured to be used with a typical airplane seat, one of skill in the art will appreciate that the seat topper 100 can be configured to be used with other types of seats. For example, and not limitation, the seat topper 100 can be configured to be used with a variety of seating options at events (e.g., concerts, sporting events, conferences, meetings, etc.) or other types of seats used in public transportation vehicles such as buses, trains, boats, cars or other public transportation vehicles. Furthermore, for simplicity in describing the various elements of the seat topper 100, the seat topper 100 is shown in a deployed stated without being placed on a seat (or chair) in FIG. 1. As will be described herein, FIG. 2 is offered as an example of the seat topper 100 in a deployed state placed on a seat.

Returning to FIG. 1, the seat topper 100 can include a back portion 102, a seat portion 104, and one or more arm portions 106. The back portion 102 can be configured to generally align with a corresponding back portion of a seat that the seat topper 100 is placed upon. Similarly the seat portion 104 can be configured to generally align with a corresponding seat portion of a seat that the seat topper 100 is placed upon and the one or more arm portions 106 can be configured to generally align with arm portions of a seat that the seat topper 100 is placed upon. As will be appreciated, the seat topper 100 can be configured to generally align and cover the support portions (seat, back rest, and/or arm rests) of a seat such that a user will interface with or contact the seat topper 100 rather than the seat that the seat topper 100 is placed upon. Because the user will interface with or contact the seat topper 100 rather than the seat, the seat topper 100 can provide additional support and comfort that the seat would be able to provide by itself. Additionally, as will be appreciated, the seat topper 100 can provide additional health benefits by providing a protective barrier for the user to prevent the user of contacting the same surfaces of the seat commonly touched by previous persons who sat in the same seat. In other words, the seat topper 100 can help to prevent the user from coming in contact with viruses, bacteria, or other harmful substances left on the surface of the seat (e.g., by a previous user of the seat).

The back portion 102, the seat portion 104, and one or more arm portions 106 can each be made from a molded foam and be integrally formed such that the back portion 102, the seat portion 104, and the one or more arm portions 106 are each connected in a continuous piece of molded foam. For example, and not limitation, the back portion 102, the seat portion 104, and the one or more arm portions 106 can each be made from a polyurethane foam, a memory foam (e.g., viscoelastic polyurethane foam, low-resistance polyurethane foam (LRPu), open cell memory foam, gel memory foam, etc.), gel foam, reflex foam, latex rubber foam, convoluted foam, Evlon foam (Lux Foam), Supreem charcoal foam, Dry Fast foam, Closed Cell foam, or any other suitable type of molded foam for the application. In other examples, the back portion 102, the seat portion 104, and the one or more arm portions 106 can each be made from a different type of material and be bonded together to form a single continuous seat topper 100. The back portion 102, the seat portion 104, and the one or more arm portions 106 can be bonded together using thermal bonding, glue, stitching, or any other suitable method of bonding the respective materials. In some examples, the back portion 102, the seat portion 104, and the one or more arm portions 106 can each be a different type of foam configured to provide support in relation to the expected weight or impact caused by a user seated upon the seat topper 100. For example, the back portion 102 can be a lighter or less-firm type of foam than the seat portion 104 which would be expected to experience a greater downward force from the weight of the user while in use.

The seat topper 100 can also include one or more cushion portions selectively located to provide ergonomic support to a user of the seat topper 100 (e.g., the seat topper 100 can be configured to be designed for comfortable and effective use of the seat topper 100). For example, the seat topper 100 can include a seat cushion 108, one or more arm cushions 110, one or more head rest cushions 112, a lumbar cushion 114, and one or more side cushions 116 (collectively, "the cushion portions"). The cushion portions can collectively form a structure of the seat topper 100 that can provide ergonomic, cradling support to the user of the seat topper 100. In some examples, the cushion portions can also be selectively sized and positioned to relieve pressure points of the user to further provide a comfortable seating arrangement for the user.

The cushion portions can each be integrally formed with the back portion 102, the seat portion 104, and one or more arm portions 106 (collectively, "the base portions"). For example, when the seat topper 100 is formed, the seat topper 100 can be formed from a single continuous piece of molded foam having the base portions and the cushion portions integrated into the single continuous piece of molded foam. Alternatively, the seat topper 100 can be formed with the base portions being separate and/or a different material from the cushion portions. In other words, the seat cushion 108 can be added to the seat portion 104 as a separate piece of material, either during the original forming of the seat portion 104 or after the seat portion 104 is formed. Similarly, the one or more arm cushions 110 can be added to the one or more arm portions 106 as a separate piece of material, either during the original forming of the one or more arm portions 106 or after the one or more arm portions 106 are formed. Furthermore, the one or more head rest cushions 112, the lumbar cushion 114, and the one or more side cushions 116 can be added to the back portion as separate pieces of material, either during the original forming of the back portion 102 or after the back portion 102 is formed.

In examples where the base portions are made from different material than the cushion portions, the base portions can comprise a firmer, or more supportive, material than the cushion portions. In this way, seat topper 100 can be configured to provide support to the user with the base portions to ensure the user's body is ergonomically supported while the cushion portions can provide additional comfort to the user. In other examples, the base portions can simply comprise a thin material configured to hold the cushion portions together and align the cushion portions on the seat such that the cushion portions are configured to provide ergonomic support to the user. For example, the base portions can comprise a cloth material or relatively thin foam material that holds the cushion portions in position when placed on a seat. In this way, the seat topper 100 can be configured to provide support and comfort with only the cushion portions while the seat that the seat topper 100 is placed upon is used to provide the underlying support to the user. In some examples, the cushion portions (i.e., the seat cushion 108, the one or more arm cushions 110, the one or more head rest cushions 112, the lumbar cushion 114, and the one or more side cushions 116) can be approximately 1-3 inches thick and be made from a gel memory foam having approximately a 3-lb density. In other examples, the cushion portions can comprise cooling gel beads configured to reduce motion and regulate a user's body heat. In yet other examples, the cushion portions can be formed of viscoelastic foam and be generally hypoallergenic.

In some examples, the head rest cushions 112 can be a wrap neck pillow. For example, the head rest cushions 112 can be sized and shaped to wrap, at least partially, around a user's neck and rest upon the user's shoulders. As will be appreciated, if the head rest cushions 112 comprise a wrap neck pillow, the head rest cushions 112 can function as a support for the user to rest his or her head upon while sleeping or otherwise resting while seated upon the seat topper 100.

The seat topper 100 can also include one or more charging ports 120 configured to provide an electric charge to a connected electronic device. For example, the seat topper 100 can have three charging ports 120 that can each be configured to provide an electric charge to a connected electronic device such as a cell phone, laptop, tablet, wearable device, or other electronic devices. For example, and not limitation, the one or more charging ports 120 can include a Universal Serial Bus (USB) connection configured to receive a corresponding USB cable to provide an electric charge to a connected electronic device.

In some examples, at least one of the one or more charging ports 120 can be configured to receive an electric charge from a connected power source to charge a battery 122 installed on, or connected to, the seat topper. For example, the seat topper 100 can be configured such that a user can plug in a charging cable to one of the one or more charging ports 120 and when the charging cable is connected to a power source, the one or more charging ports 120 can facilitate charging of an integral battery 122 of the seat topper 100. In some examples, the battery 122 can be removably installed such that a user can remove the battery 122 and install a replacement battery 122 when desired. The battery 122 can be any type of battery suitable for the particular application. Furthermore, although shown as installed in the seat portion 104, the battery 122 can be installed in any suitable location on or in the seat topper 100. For example, the battery 122 can be installed in the seat cushion 108, the seat portion 104, the back portion 102, or any other suitable location in the seat topper 100 for the application. Furthermore, the battery 122 can simply be attached to a surface of the seat topper 100 (e.g., via a hook-and-loop fastener, a magnetic connection, etc.) or installed in an integral pocket or chamber built into the seat topper 100.

The seat topper 100 can further include one or more storage pockets 130 configured to receive and hold one or more items. For example, the one or more storage pockets 130 can be sized to receive a mobile device, a magazine, a book, a drink, a snack, a wallet, a set of keys, and other personal items. At least one storage pocket 130 can be positioned proximate the one or more charging ports 120 such that a user can placed her or her electronic device in the pocket while the device is being charged via the one or more charging ports 120.

In some examples, the storage pocket 130 can be configured to double as a storage device for the seat topper 100 when in a stowed state. For example, the seat topper 100 can be configured to be rolled up and placed inside of the storage pocket 130. As will be appreciated, if the storage pocket 130 is configured to double as a storage device for the seat topper 100, the storage pocket 130 can be sized and positioned to receive the seat topper 100 when in a sowed state (e.g., proximate an edge of the seat portion 104 such that the seat topper 100 can be rolled and stuffed into the storage pocket 130). In other examples, the storage pocket 130 can comprise a stretchable material to help facilitate receiving and securing the seat topper 100 when in the stowed state.

The seat topper 100 can also include one or more fasteners 140 configured to secure the seat topper 100 in the stowed state and/or secure the seat topper 100 to a seat in the deployed state. Although depicted in FIG. 1 (and FIGS. 2-7) as being attached proximate an upper portion of back portion 102 of the seat topper 100, the fasteners 140 can be attached to the seat topper 100 in other locations to facilitate securing the seat topper 100 to a seat in a deployed state and to itself in a stowed state. In other examples, the fasteners 140 can be detached from the seat topper 100 altogether. The fasteners 140 can be a strap, elastic band, tie, rope, drawstring, or other type of band that can be used to wrap around the seat topper 100 and/or the seat. In some examples, fasteners 140 can include a hook-and-loop fastener, a magnetic fastener, buttons, snap-fit buttons, or other similar fasteners that can be used to secure the seat topper 100. The fasteners 140, as depicted in FIG. 1, can be configured to be rolled and secured to the seat topper 100 near the head rest cushions 112 when the seat topper 100 is in a deployed state.

To secure the seat topper 100 when in a stowed state, the fasteners 140 can be configured to wrap around the seat topper 100 when rolled, or otherwise placed in a compact configuration, to a stowed state. The fasteners 140 can secure the seat topper 100 in the stowed state by, for example, attaching the hook-and-loop fastener, wrapping the elastic band around the seat topper 100, aligning the magnetic fasteners, fastening the buttons or snap-fit buttons, etc. In some examples, the fasteners 140 can be sized to double as a handle or strap that can facilitate easier transportation of the seat topper 100 when in the stowed state.

The fasteners 140 can be used to secure the seat topper 100 to the seat. For example, the fasteners 140 can be wrapped around the chair and fastened to each other to secure the seat topper 100 to the chair. Alternatively, or in addition, the fasteners 140 can be configured to align with corresponding fasteners on the seat itself. For example, the seat can have one or more hook-and-loop fasteners, magnetic fasteners, buttons, snap-fit buttons, or other similar fasteners configured to align with the corresponding fasteners 140 on the seat topper 100. In this way, the user can fasten the seat topper 100 to the seat and ensure the seat topper 100 is secured in place while in use. In some examples the fasteners 140 can be magnetic fasteners and be configured to align with corresponding metal (or ferrous) portions of the seat to secure the seat topper 100 to the seat. In other examples, the fasteners 140 can be hook-and-loop fasteners configured to align with corresponding hook-and-loop fasteners and/or material portions that the hook-and-loop fastener can attach to secure the seat topper 100 to the seat.

In some examples, the seat topper 100 can include a removeable cover configured to provide additional comfort to a user and protection to the seat topper 100. For example, the removeable cover can be a cloth material that can be removed from the seat topper 100 and machine washed such that the seat topper 100 can remain clean and relatively free of dirt, grease, liquids or other similar stain-causing substances. In some examples, the removeable cover can be a non-slip cover configured to prevent movement of the removeable cover on the seat topper 100. In some examples, the removeable cover can be water and stain resistant and comprise a zipper, hook-and-loop fastener, buttons, or other similar fastener to encase the seat topper 100 to provide protection to the seat topper 100 on all sides. The removeable cover can also be made of material or otherwise treated to provide odor neutralizing, anti-microbial protection. The removeable cover can also comprise a high thread count and a textured back to prevent sliding of the removeable cover on the seat topper 100. In other examples, the non-slip cover can be formed of cotton and include a stretch-to-fit skit to help retain the removeable cover on the seat topper 100.

FIG. 2 is a front view of an exemplary seat topper 100 in a deployed state, according to an example of the present disclosure. The seat topper 100 in FIG. 2 is depicted as being installed on, or placed on, a seat 200 while in a deployed state. As previously described, the seat topper 100 can be configured to be used with a variety of seating options at events (e.g., concerts, sporting events, conferences, meetings, etc.) or other types of seats used in public transportation vehicles such as buses, trains, boats, cars or other public transportation vehicles.

Figure 3:
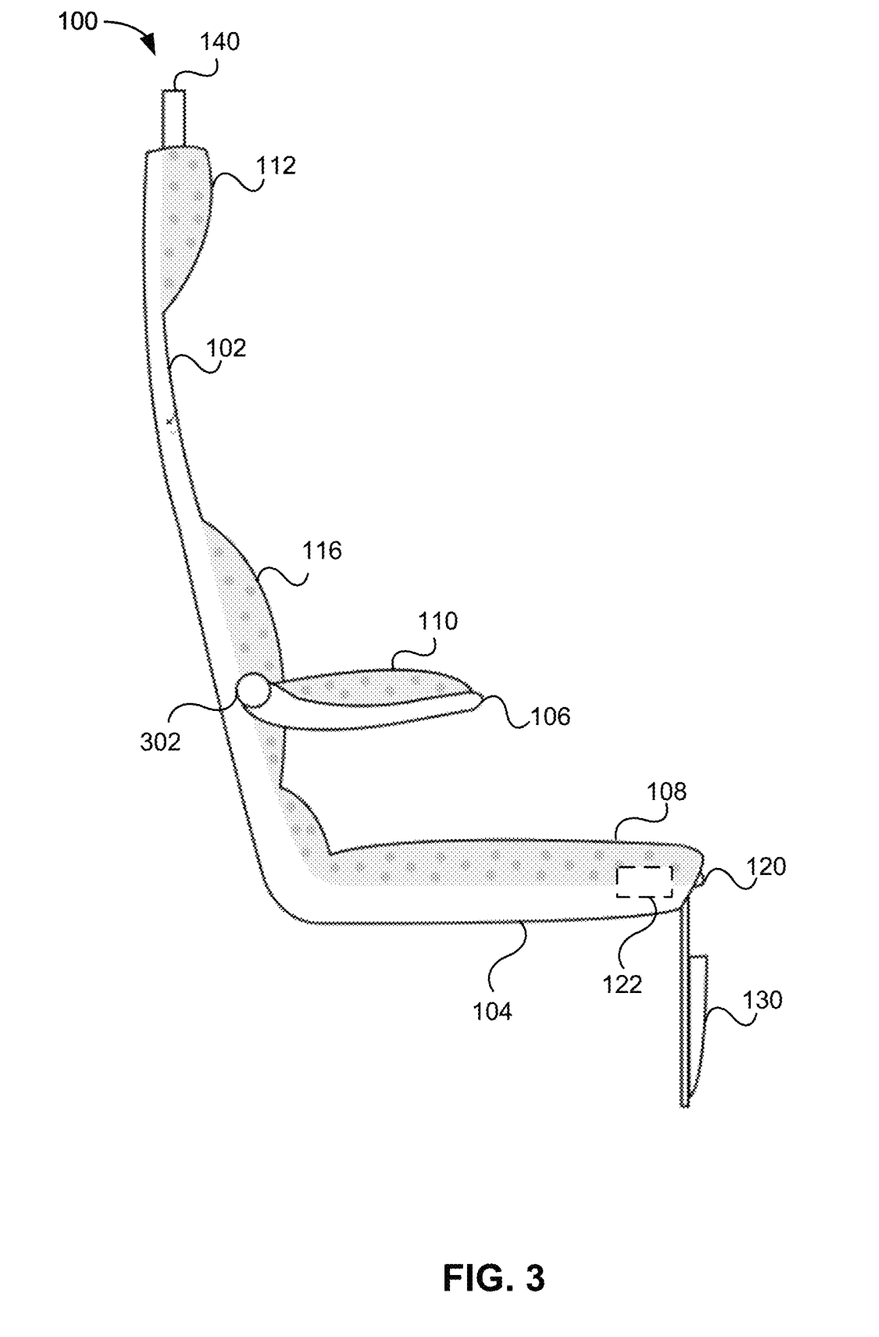
FIG. 3 is a side view of an exemplary seat topper in a deployed state, according to an example of the present disclosure.
Figure 4:
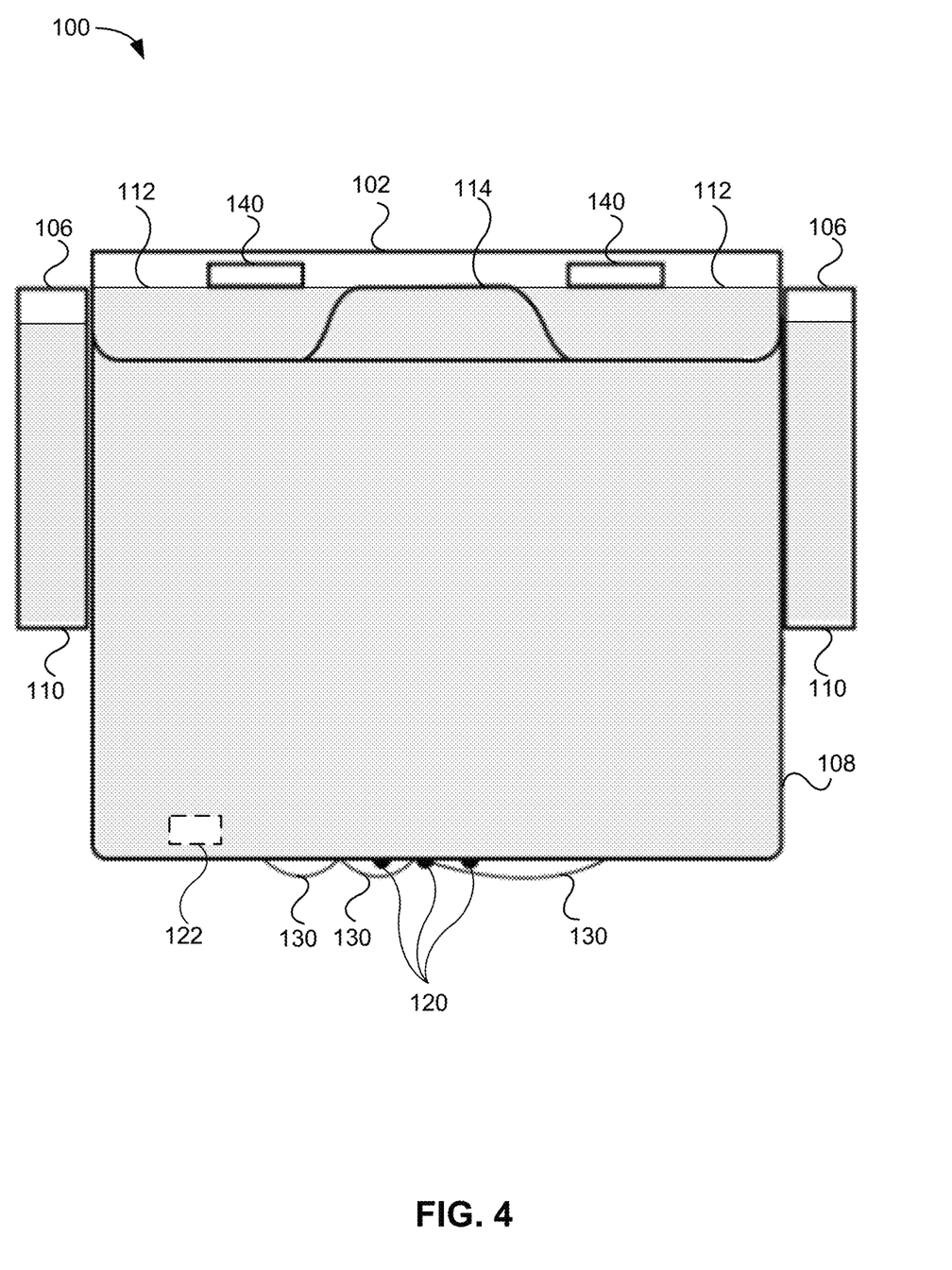
FIG. 4 is a top view of an exemplary seat topper in a deployed state, according to an example of the present disclosure.

FIG. 3 is a side view while FIG. 4 is a top view of an exemplary seat topper 100 once again depicted in the deployed state without the seat 200 for explanatory purposes. As shown, the seat topper 100 of FIG. 3 can include all of the same elements previously described. Furthermore, in some examples, the seat topper 100 can include one or more hinge points 302 configured to allow the arm portions 106 and the arm cushions 110 to rotate freely with respect to the back portion 102. As will be appreciated by one of skill in the art, by include one or more hinge points 302, the seat topper 100 can be configured such that the arm portions 106 and the arm cushions 110 can be placed on and rotate along with an arm rest of a seat. For example, many seats an arm rest that can be rotated from a generally horizontal position to a generally vertical position to make it easier for a user to get in and out of the seat. Having a hinge point 302 can facilitate the arm portions 106 and the arm cushions 110 similarly rotating from a generally horizontal position to a generally vertical position along with the arm rests.

Figure 5:
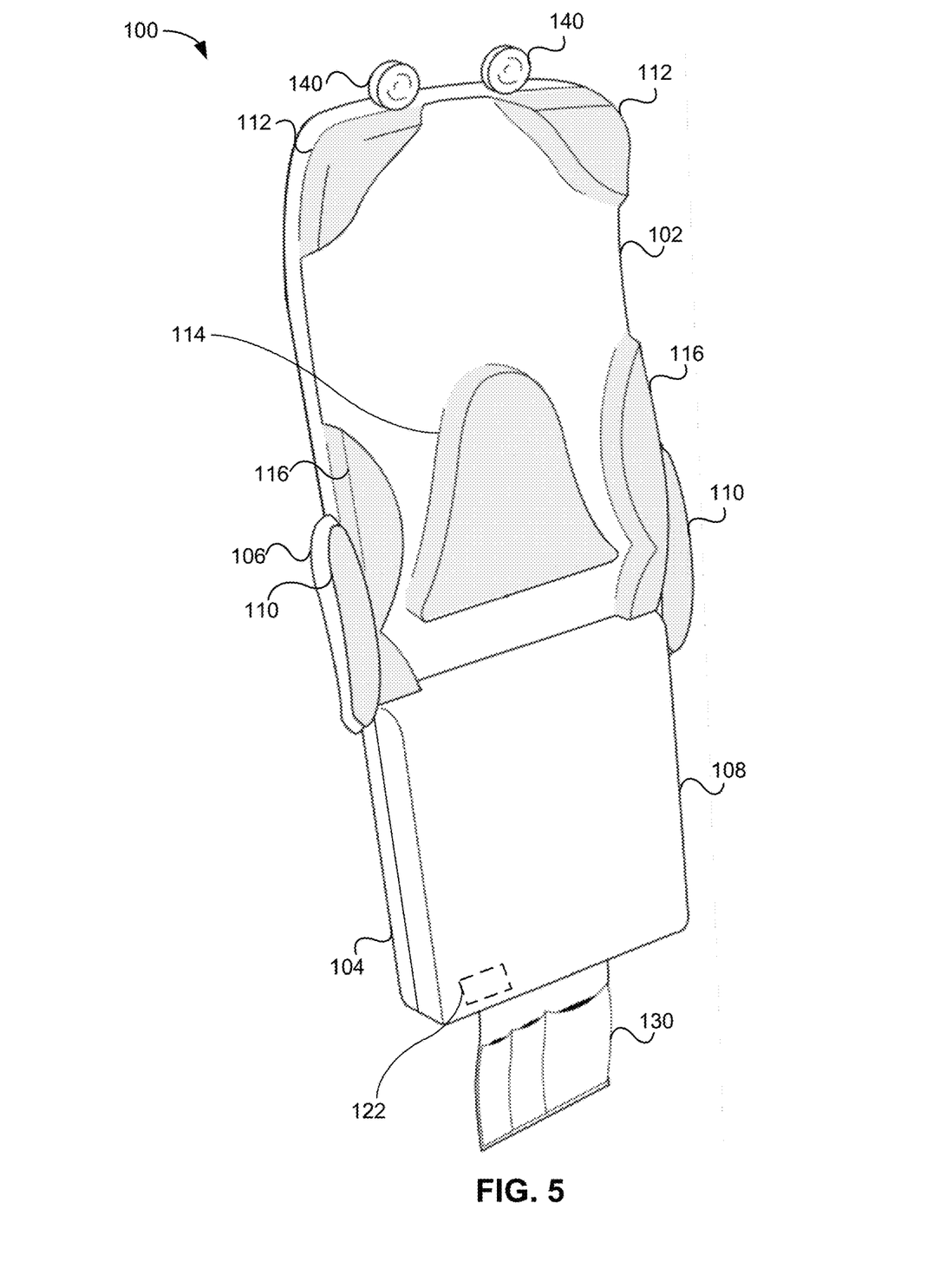
FIG. 5 is a top perspective view of an exemplary seat topper in an unrolled state, according to an example of the present disclosure.

FIG. 5 is a top perspective view of an exemplary seat topper 100 in an unrolled state, according to an example of the present disclosure. As depicted in FIG. 5, the seat topper 100 can be unrolled or otherwise unstowed to a generally flat position (e.g., the unrolled state). As depicted in FIG. 5, the back portion 102, the seat portion 104, the arm portions 106 and each of the corresponding cushion portions can be configured to be generally coplanar when the seat topper 100 is in the unrolled state.

Figure 6:
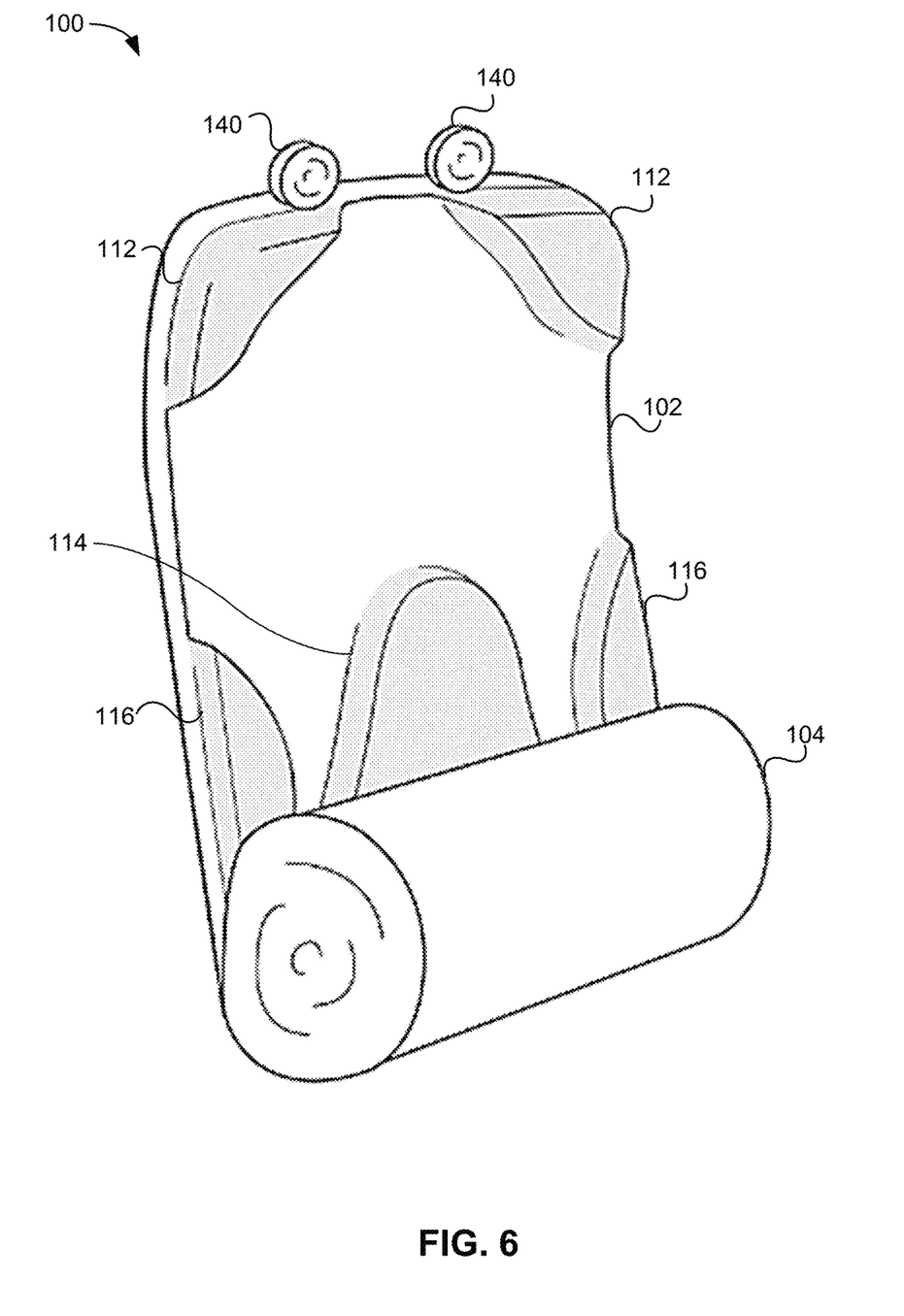
FIG. 6 is a side perspective view of an exemplary seat topper in transition between a rolled state and an unrolled state, according to an example of the present disclosure.

As will be appreciated by one of skill in the art, when the seat topper 100 is in the unrolled state and the back portion 102, the seat portion 104, the arm portions 106 and each of the corresponding cushion portions are generally coplanar, the seat topper 100 can be easily rolled, or otherwise stowed, to a rolled position. FIG. 6 is a top perspective view of an exemplary seat topper 100 in transition between a rolled state and an unrolled state, according to an example of the present disclosure. As depicted in FIG. 6, the seat topper 100 can be rolled from one end of the seat topper (the end of the seat portion 104 in FIG. 6) to another end (the top end of the back portion 102 in FIG. 6) to move the seat topper 100 to a rolled (or stowed state). Additionally, the seat topper 100 can be unrolled from one end (the top end of the back portion 102 in FIG. 6) to another end (the end of the seat portion 104 in FIG. 6) to move the seat topper 100 to the unrolled state (or deployed state).

When being transitioned from the unrolled state to the rolled state by a user, the arm portions 106 and the arm cushions 110 can be folded inwardly such that the arm portions 106 and the arm cushions 110 can be rolled up into the back portion 102 and/or the seat portion 104. By folding the arm portions 106 and the arm cushions 110 inwardly, the seat topper 100 can be configured to transition to a more compact rolled and/or stowed state.

Figure 7:
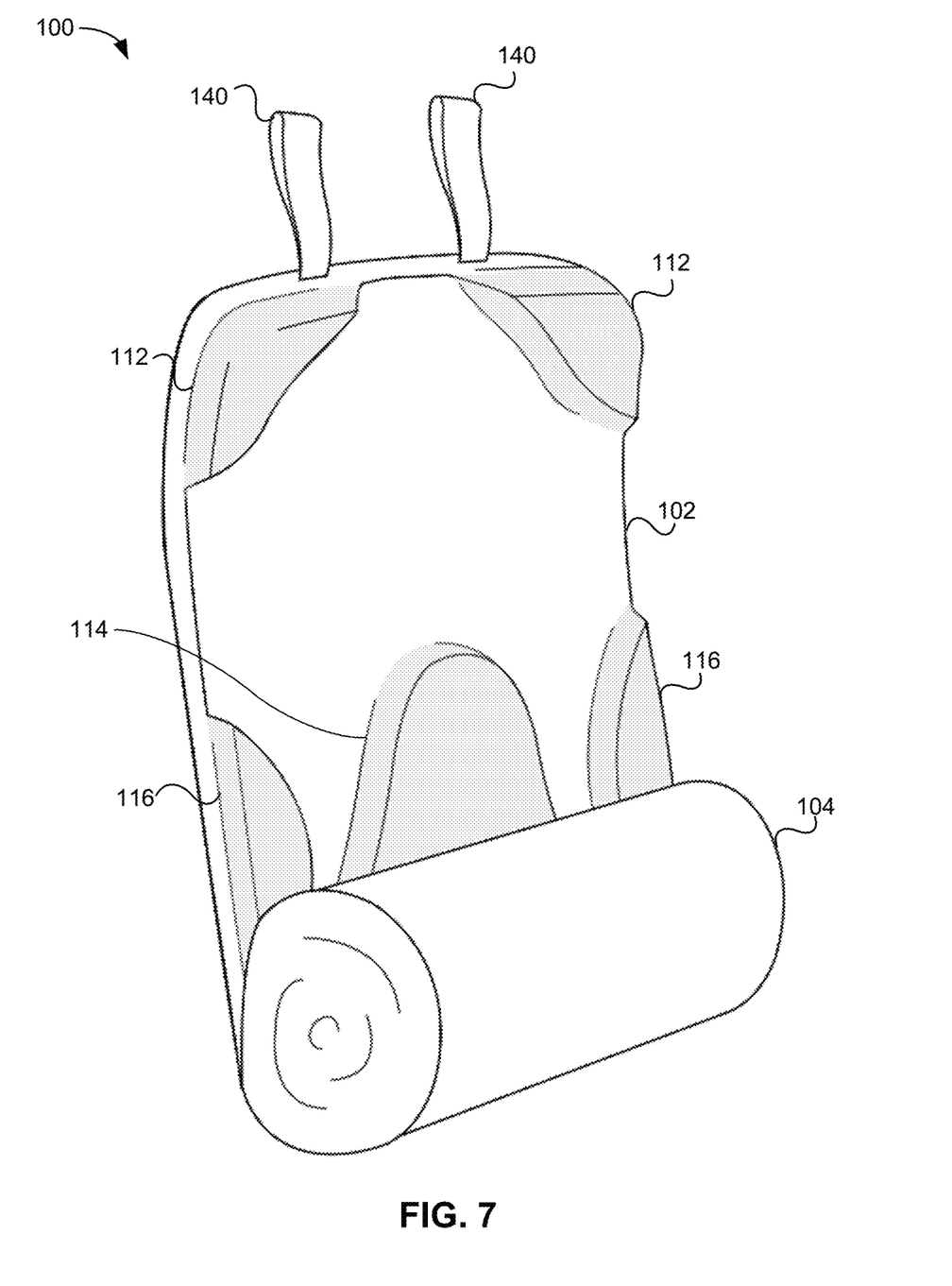
FIG. 7 is a side perspective view of an exemplary seat topper in transition between a rolled state and an unrolled state, according to an example of the present disclosure.

In some examples, and as depicted in FIG. 7, the seat topper 100 can include the fasteners 140 near an end of the back portion 102 that can be unrolled and prepared to be wrapped around the seat topper 100 to secure the seat topper 100 in the stowed state. Similarly, the fasteners 140 that can be wrapped around the seat topper 100 can be loosened to facilitate unrolling the seat topper 100 to an unrolled state. As will be appreciated by one of skill in the art, the fasteners 140 can be positioned such that, when the seat topper 100 is in the rolled state, the fasteners 140 can be wrapped around the seat topper 100 and secured (either to the fastener 140 itself, to the other fastener 140, or to the seat topper 100 itself) such that the seat topper 100 can be secured in the stowed state.

Figure 8:
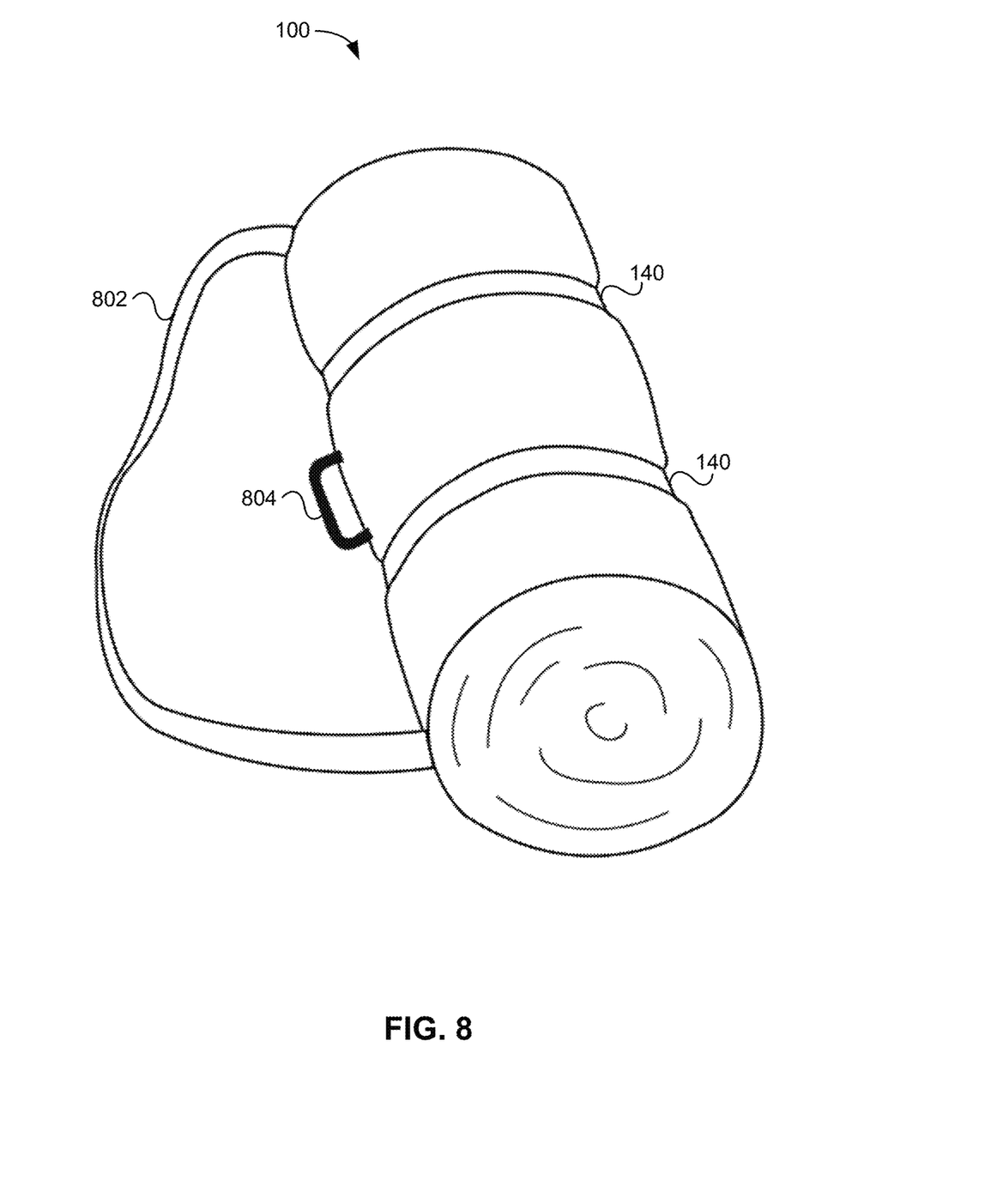
FIG. 8 is a side perspective view of an exemplary seat topper in a stowed state, according to an example of the present disclosure.

FIG. 8 is a side perspective view of an exemplary seat topper 100 in a stowed state, according to an example of the present disclosure. As depicted in FIG. 8, the seat topper 100 can be secured in the stowed state with the one or more fasteners 140. Furthermore, the seat topper 100 can further include a handle 804 and/or a strap 802 that can both be used to facilitate the seat topper 100 being easily transported from one location to another. In some examples, the strap 802 can be a larger fastener 140 that can also be used to fasten the seat topper 100 to the seat 200 when in the deployed state. Similarly, the handle 804 can be configured to double as a fastener 140 that can be configured to fasten the seat topper 100 to the seat 200.

Although depicted as simply being rolled up and secured in the stowed state, the seat topper 100 can be configured to be placed into a separate carrying case or, as previously described, a storage pocket 130 attached to the seat topper 100 and configured to receive the seat topper 100. In this way, the seat topper 100 can be stowed in such a way that the seat topper 100 can be transported with the various portions of the seat topper 100 protected by the carrying case or the storage pocket 130. In other examples, rather than being rolled-up, the seat topper 100 can be configured to simply be stuffed into a carrying case, storage pocket, or other luggage to place the seat topper 100 in the stowed state. Furthermore, in some examples, the seat topper 100 can be sized and configured to be placed into a common carry-on size luggage, backpack, purse, or other type of luggage or pack in which a user can carry the seat topper 100.

Figure 9:
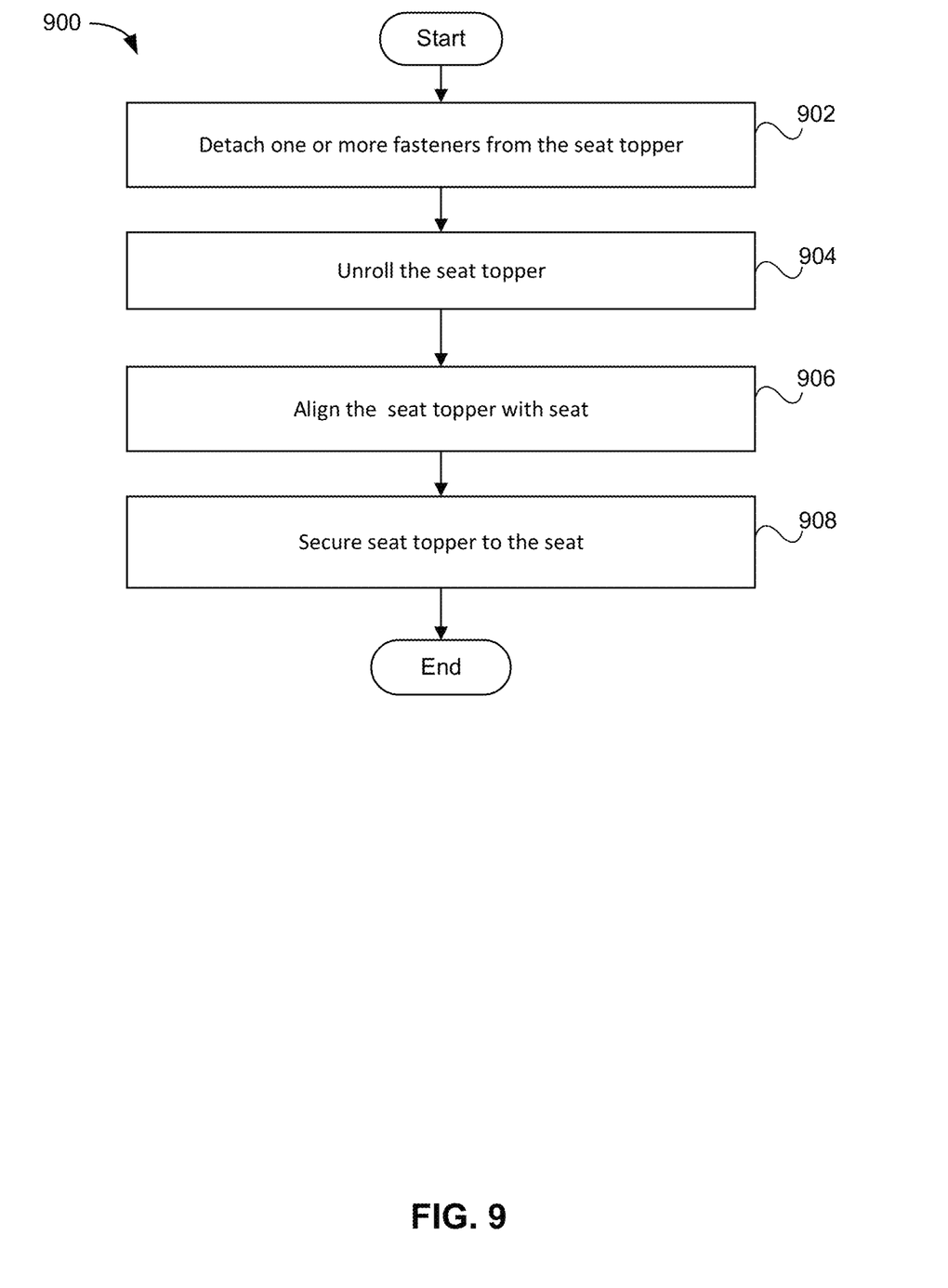
FIG. 9 is a flow diagram illustrating a method of transitioning an exemplary seat topper from a stowed state to a deployed state, according to an example of the present disclosure.

FIG. 9 is a flow diagram illustrating a method 900 of transitioning an exemplary seat topper (e.g., seat topper 100) from a stowed state to a deployed state, according to an example of the present disclosure. The method 900 can include detaching 902 one or more fasteners (e.g., fasteners 140) from the seat topper. As will be appreciated by one of skill in the art considering the above-described technology, detaching 902 one or more fasteners from the seat topper 100 can include, but is not limited to, loosening a strap, detaching a hook-and-loop fastener, detaching a magnetic fastener, detaching a snap button, untying a cord, or any other similar act or method that can detach the fastener from the seat topper. Furthermore, the seat topper can include all of the above-described components described in relation to the seat topper 100.

The method 900 can include unrolling 904 the seat topper from a rolled (or stowed state) to an unrolled state. For example, after detaching 902 the one or more fasteners from the seat topper, a user can unroll 904 the seat topper to an unrolled state such that the seat topper is generally flat. Unrolling 904 the seat topper can include gripping an end of the seat topper and causing the remaining rolled portion of the seat topper to unroll (e.g., by lifting the end of the seat topper, pushing the rolled portion of the seat topper, or otherwise causing the seat topper to unroll). In other examples, unrolling 904 the seat topper can comprise pulling a seat topper out of a bag or case whether or not the seat topper is rolled. For example, if the seat topper is simply stuffed into a bag or case, the seat topper can simply be pulled from the bag or case to cause the seat topper to a generally flat state (unrolled state).

The method 900 can include aligning 906 the seat topper with the seat. For example, a user can align a head rest portion (e.g., the head rest cushions 112) with a head rest of the seat. Alternatively, or in addition, aligning 906 the seat topper with the seat can include aligning a back portion (e.g., the back portion 102) with a back rest of the seat, aligning an arm portion (e.g., arm rest portion 106) with an armrest of the seat, and/or aligning a seat portion (e.g., seat portion 104) with a base or seat portion of a seat.

The method 900 can include securing 908 the seat topper to the seat. Securing 908 the seat topper to the seat can include securing the back portion to a back rest of the seat, securing an arm portion 106 to an arm rest of the set, and/or securing a seat portion to a base or seat portion of the seat. Furthermore, securing 908 the seat topper to the seat can include securing one, some, or all of the just-mentioned portions of the seat topper to the seat using fasteners (e.g., fasteners 140). Securing 908 the seat topper to the seat with the fasteners can include the use of strap, cables, cords, and/or ties that are secured by a knot, a hook-and-loop fastener, a magnetic fastener, buttons, snap buttons, and/or any other suitable fastener for the application. Furthermore, fasteners may be wrapper around at least a portion of the seat and fastened to a corresponding portion of the fastener or the fasteners can be fastened directly to the seat by fastening with a corresponding fastener on the seat or to materials of the seat (e.g., the magnetic fastener can attached to a metal or ferrous portion of the seat and/or the hook-and-loop fastener can attached to a suitable material portion of the seat).

Figure 10:
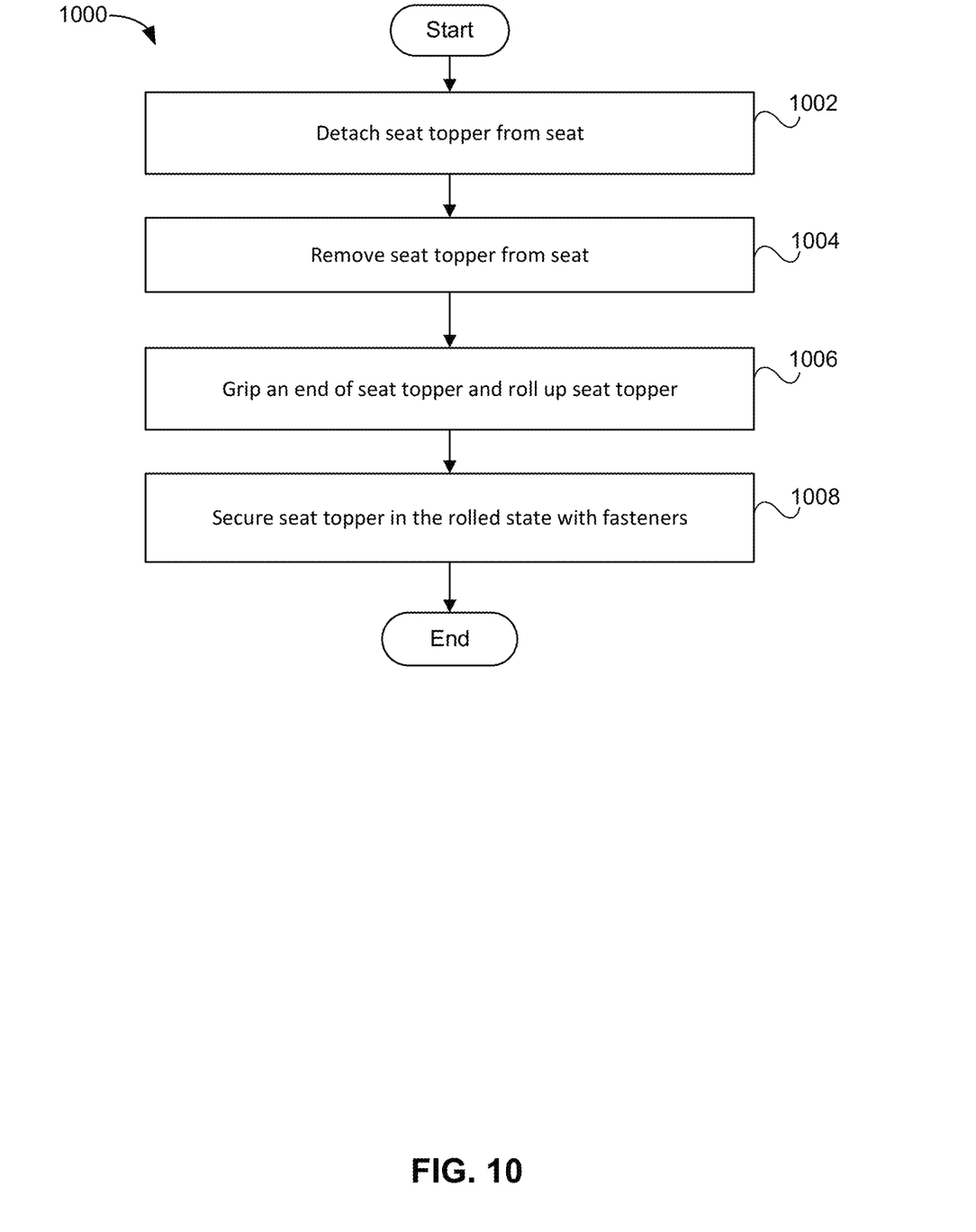
FIG. 10 is a flow diagram illustrating a method of transitioning an exemplary seat topper from a deployed state to a stowed state, according to an example of the present disclosure.

FIG. 10 is a flow diagram illustrating a method 1000 of transitioning an exemplary seat topper (e.g., seat topper 100) from a deployed state to a stowed state, according to an example of the present disclosure. In other words, the disclosed technology can include a method 1000 of stowing a seat topper. The method 1000 can include detaching 1002 a seat topper from a seat. Detaching the seat topper from the seat can include detaching 902 one or more fasteners (e.g., fasteners 140) of the seat topper either from itself, another fastener 140, a fastener on the seat, or from the seat itself. As will be appreciated by one of skill in the art considering the above-described technology, detaching 1002 one or more fasteners from the seat topper 100 can include, but is not limited to, loosening a strap, detaching a hook-and-loop fastener, detaching a magnetic fastener, detaching a snap button, untying a cord, or any other similar act or method that can detach the fastener from the seat topper. Furthermore, the seat topper can include some or all of the components described herein in relation to the seat topper 100.

The method 1000 can include removing 1004 the seat topper from the seat. For example, removing 1004 the seat topper from the seat can include gripping the seat topper and lifting upwardly or otherwise pulling the seat topper from the seat. The method 1000 can include gripping 1006 an end of the seat topper and rolling up the seat topper to a rolled state. For example, a user can grip to end of the back portion (e.g., back portion 102) and roll the seat topper toward the end of the seat portion (e.g., seat portion 104), grip the end of the seat portion and roll the seat topper toward the end of the back portion, or grip a side of the seat topper and roll from one side to another side of the seat topper. Furthermore, gripping 1006 an end of the seat topper and rolling up the seat topper can include folding the arm portions (e.g., one or more arm portions 106) inwardly to cause the seat topper to be in a more compact state when in the rolled or stowed state. Alternatively, gripping 1006 an end of the seat topper and rolling up the seat topper can include, be replaced by, gripping the seat topper and stuffing the seat topper into a bag or case.

The method 1000 can include securing 1008 the seat topper in the rolled state with fasteners to secure the seat topper in the stowed state. Securing 1008 the seat topper in the rolled state with fasteners can include, but is not limited to, attaching strap, cord, cable, rope, or other similar restraining device with a knot, a hook-and-loop fastener, a magnetic fastener, a button, a snap button, a cord, or any other similar act or method that can secured the seat topper in the stowed state. Alternatively, or in addition, securing 1008 the seat topper in the rolled state with fasteners can include stuffing or otherwise placing the seat topper (whether rolled or unrolled) into a bag, sack, backpack, purse, luggage, or other type of case that can retain the seat topper in the stowed state. In some examples, the bag, sack, or case can be or include the storage pocket 130 of the seat topper. Thus, the seat topper 100 can be configured to roll up into (or otherwise be stuffed into) the storage pocket 130 to placed and secure the seat topper in the stowed state.

As will be appreciated, the methods 900 and 1000 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method (e.g., method 900, etc.) and at least some elements or steps of a second method (e.g., method 1000, etc.).

The definitions of the words or elements of the following claims are, therefore, defined in this specification to not only include the combination of elements which are literally set forth. It is also contemplated that an equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A stowable molded foam seat topper, comprising;
  a seat portion;
  a back portion attached to the seat portion;
  one or more arm portions attached to the back portion;
  one or more cushion portions attached to the back portion;
  one or more fasteners configured to secure the stowable molded foam seat topper in a stowed state when fastened,
  wherein the seat portion, the back portion, and the one or more arm portions each comprise a molded foam material and are configured to impart ergonomic support to a user when in a deployed state,
wherein the stowable molded foam seat topper is configured to be transitioned between the stowed state and the deployed state,
the stowed state comprising the seat portion, the back portion, the one or more arm portions, and the one or more cushion portions being rolled together and secured in place by the one or more fasteners; and
the deployed state comprising the seat portion, the back portion, the one or more arm portions, and the one or more cushion portions being unrolled, aligned with a seat, and secured to the seat.

2. The stowable molded foam seat topper of claim 1, wherein the one or more fasteners comprises one or more straps configured to secure the stowable molded foam seat topper in the stowed state.

3. The stowable molded foam seat topper of claim 2, wherein the one or more straps are further configured to secure the stowable molded foam seat topper to the seat when in the deployed state.

4. The stowable molded foam seat topper of claim 1, further comprising one or more handles configured to be gripped by a user to transport the stowable molded foam seat topper when in the stowed state.

5. The stowable molded foam seat topper of claim 1, further comprising one or more securing fasteners configured to secure the stowable molded foam seat topper to the seat when in the deployed state.

6. The stowable molded foam seat topper of claim 1, wherein the seat portion, back portion, one or more arm portions, and cushion portions further comprise gel memory foam.

7. The stowable molded foam seat topper of claim 1, wherein at least one of the one or more cushion portions are configured to provide ergonomic support to a user's neck and shoulders when the user is seated upon the stowable molded foam seat topper.

8. The stowable molded foam seat topper of claim 7, wherein the one or more cushion portions comprises a wrap neck pillow.

9. The stowable molded foam seat topper of claim 7, wherein at least one of the one or more cushion portions are configured to provide ergonomic support to a user's hips and sides when a user is seated upon the stowable molded foam seat topper.

10. The stowable molded foam seat topper of claim 9, wherein at least one of the one or more cushion portions are configured to provide ergonomic support to a user's lower back when a user is seated upon the stowable molded foam seat topper.

11. The stowable molded foam seat topper of claim 7, further comprising one or more arm cushion portions attached to the one or more arm portions.

12. The stowable molded foam seat topper of claim 1, wherein the one or more cushion portions comprise hypoallergenic viscoelastic foam.

13. The stowable molded foam seat topper of claim 1, wherein the cushion portions comprise cooling gel beads.

14. The stowable molded foam seat topper of claim 1, further comprising a storage pocket attached to the seat portion and configured to store one or more objects.

15. The stowable molded foam seat topper of claim 14, wherein the storage pocket is further configured to secure the stowable molded foam seat topper in the stowed state.

16. The stowable molded foam seat topper of claim 1, further comprising a battery and one or more charging ports, wherein the battery and one or more charging ports are configured to provide a charge to a connected electronic device.

17. The stowable molded foam seat topper of claim 1, further comprising a removeable nonslip cover configured to cover the stowable molded foam seat topper.

18. The stowable molded foam seat topper of claim 17, wherein the removeable nonslip cover comprises water resistant material.

19. The stowable molded foam seat topper of claim 17, wherein the removeable nonslip cover comprises a textured backing configured to prevent sliding of the removeable nonslip cover on the stowable molded foam seat topper.

20. The stowable molded foam seat topper of claim 17, wherein the removeable nonslip cover comprises a machine-washable material.

* * * * *